March 17, 1931.   A. PETERSEN   1,796,618
WAVE MOTOR
Filed May 7, 1930

Inventor
August Petersen
by Martin O. Smith
Attorney

Patented Mar. 17, 1931

1,796,618

UNITED STATES PATENT OFFICE

AUGUST PETERSEN, OF COMPTON, CALIFORNIA

WAVE MOTOR

Application filed May 7, 1930. Serial No. 450,391.

My invention relates to a wave motor and has for its principal object the provision of relatively simple, practical and efficient means for utilizing the waves of the ocean or sea for the economical development of power.

Further objects of my invention are, to provide a wave motor that includes a floating structure on which are mounted one or more pumps that are actuated by wave power for pumping air or water into a container, further to mount on said floating structure two or more swinging platforms that are actuated by the pressure of waves passing thereover, further to arrange operative connections between said platforms and the pump or pumps so that the latter will be continuously operated as a result of movement of the platforms and further, to arrange the platforms so that the same are successively engaged by waves and the positions thereof reversed so as to bring about the desired reciprocatory motion that is transmitted to the pump or pumps.

With the foregoing and other objects in view, my invention consists in certain novel features of construction and arrangement of parts that will hereinafter be more fully described and claimed and illustrated in the accompanying drawings, in which:

Figure 1:
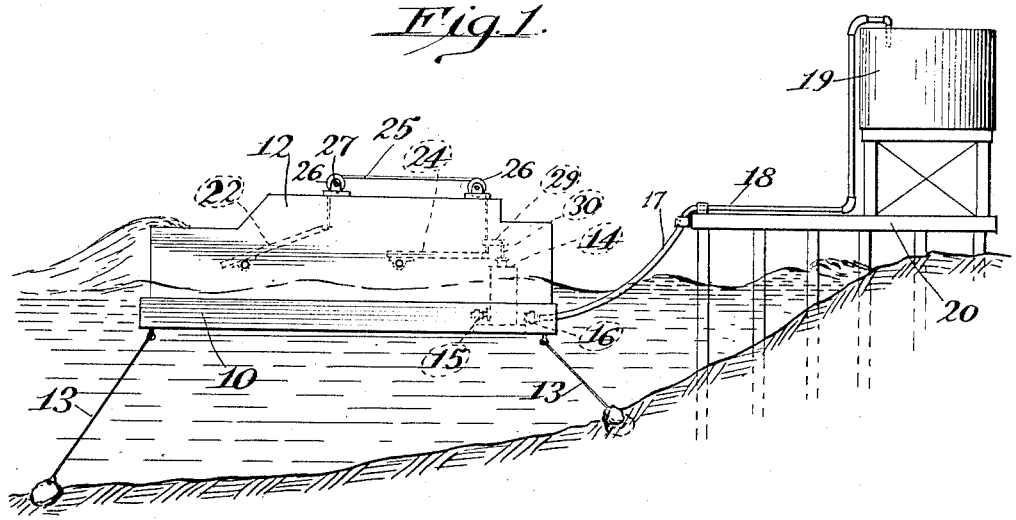
Fig. 1 is a side elevational view of a wave motor constructed in accordance with my invention.
Figure 2:
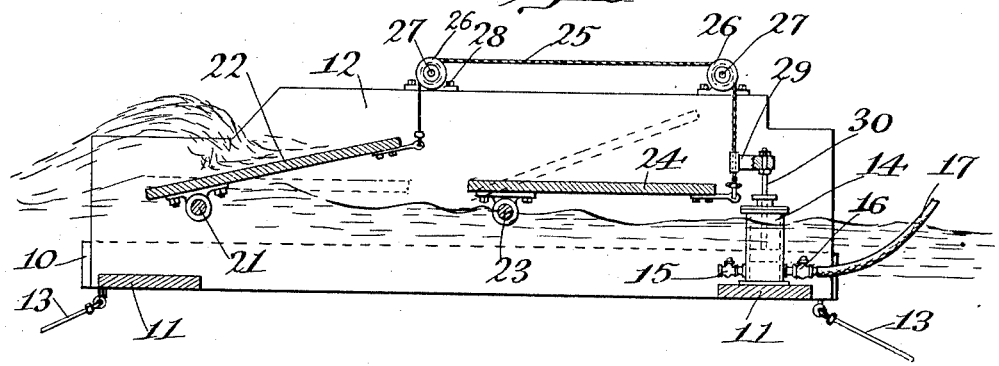
Fig. 2 is a vertical section taken lengthwise through the center of the wave motor.
Figure 3:
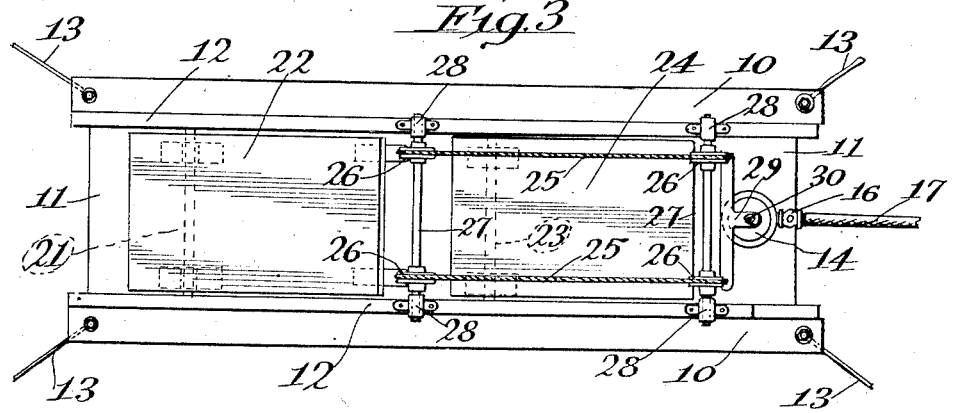
Fig. 3 is a top plan view of the motor.

Referring by numerals to the accompanying drawings which illustrate a practical embodiment of my invention, 10, 10 designate heavy base timbers that are arranged parallel with each other and which are framed together adjacent to their ends by cross timbers 11. The timbers 10 may be of any desired length and spaced a suitable distance apart and arranged on top of these timbers and projecting upwardly therefrom are vertically disposed parallel side walls 12 that are preferably formed of heavy wooden planks. This structure being formed of wood will readily float on the surface of the sea or ocean and to maintain the same in desired position the structure is anchored to the ground by suitably located chains or cables 13.

Arranged in the rear portion of the floating structure and preferably supported by one of the transverse timbers 11 is a pump or a series of pumps such as 14 of the type having a reciprocating piston and with inlet and outlet check valves 15 and 16 respectively.

Leading from the outlet valve is a flexible tube 17, preferably a heavy hose and said flexible tube leads to a pipe 18 that discharges into a tank 19.

This tank is supported at a suitable elevation upon a pair of platforms 20 and which latter is built on the shore adjacent to where the wave motor is anchored.

Journaled in the forward portions of the side walls 12 is a transverse shaft 21 and suitably hinged thereto is one end of a platform 22, preferably formed of heavy wooden planks and which extends rearwardly between the side walls 12.

A second transverse shaft 23 is journaled in the side walls 12 in the same horizontal plane with shaft 21. A short distance to the rear of the rear end of platform 22 and hinged to this shaft 23 is a platform 24 and preferably constructed of heavy wooden planks and which extends rearwardly between the side walls 12.

Suitably connected to the rear ends of the platforms 22 and 24 are the ends of flexible members, preferably wire cables 25, and these cables extend from the ends of the platforms upwardly and pass over grooved pulleys 26 that are carried by shafts 27 and the ends of the latter being journaled in boxes 28 on top of the side walls 12.

Connecting the rear portions of the cables 25 is a cross bar 29 and the central portion of this cross bar is suitably connected to the upper end of the piston rod 30 of pump 14.

The cables 25 are connected to the rear ends of the platforms 22 and 24 so that when one platform occupies a substantially horizontal position the other platform is inclined upwardly and rearwardly.

Waves on the surface of the sea or ocean moving toward the shore will pass over platform 22 in the forward end of the structure and the weight of the water in such waves will depress or swing the rear end of the platform downwardly and through the cable connections the rear platform 24 will be swung upwardly and the piston within the pump 14 will be elevated within the cylinder. After the wave passes over the platform 22 and moves the same downward into a substantially horizontal position said wave will pass over the rear platform 24 and the weight of the water will swing said rear platform downwardly and through the cable connections front platform 22 will be swung upwardly into an inclined position so as to receive the succeeding wave and the piston in the pump 14 will be forced downward, thereby forcing water that was drawn into the pump cylinder outwardly through flexible tube 17 and pipe 18 into the elevated tank 19.

Inasmuch as the waves adjacent to the sea shore are practically continuous the motor will be continuously operated so as to pump water into an elevated tank or container and the weight of this water may be utilized for driving turbines, electric generators or the like.

In the event that it is desired to compress and pump air into suitable tanks or containers, the pump or compressor is located on the rear portion of the floating structure above the normal water line.

While I have shown my improved wave motor as having two swinging platforms it will be understood that three or more of the platforms may be arranged in line, one behind the other, and that two or pumps may be connected to the platforms for operation thereby, thus materially increasing the power output of the structure.

Thus it will be seen that I have provided a wave motor that is relatively simple in construction and which utilizes the weight of the water in the waves of the ocean for the economical development of power.

It will be understood that minor changes in the size, form and construction of the various parts of my improved wave motor may be made and substituted for those herein shown and described without departing from the spirit of my invention, the scope of which is set forth in the appended claims.

I claim as my invention:

1. In a wave motor, a floating structure, a pair of swinging platforms arranged in said floating structure, one behind the other, flexible connections between said swinging platforms and a pump that is actuated by said platforms and connections.

2. In a wave motor, a floating structure, a plurality of platforms mounted for swinging movement in said structure, said platforms being arranged one behind the other, flexible connections between said platforms whereby said platforms swing simultaneously in opposite directions and a pump connected to said flexible connections.

3. In a wave motor, a floating structure, means for anchoring the same to the ground, a pair of swinging platforms pivoted at one end arranged for operation within said floating structure and disposed in tandem arrangement and flexible connections between the free ends of said platforms whereby said platforms swing simultaneously in opposite directions.

4. In a wave motor, a floating structure, means for anchoring the same to the ground, a pair of swinging platforms pivoted at one end arranged for operation within said floating structure and disposed in tandem arrangement, flexible connections between the free ends of said platforms whereby said platforms swing simultaneously in opposite directions, a pump connected and a connection between said pump and said flexible connections.

In testimony whereof I affix my signature.

AUGUST PETERSEN.